Figure 1:
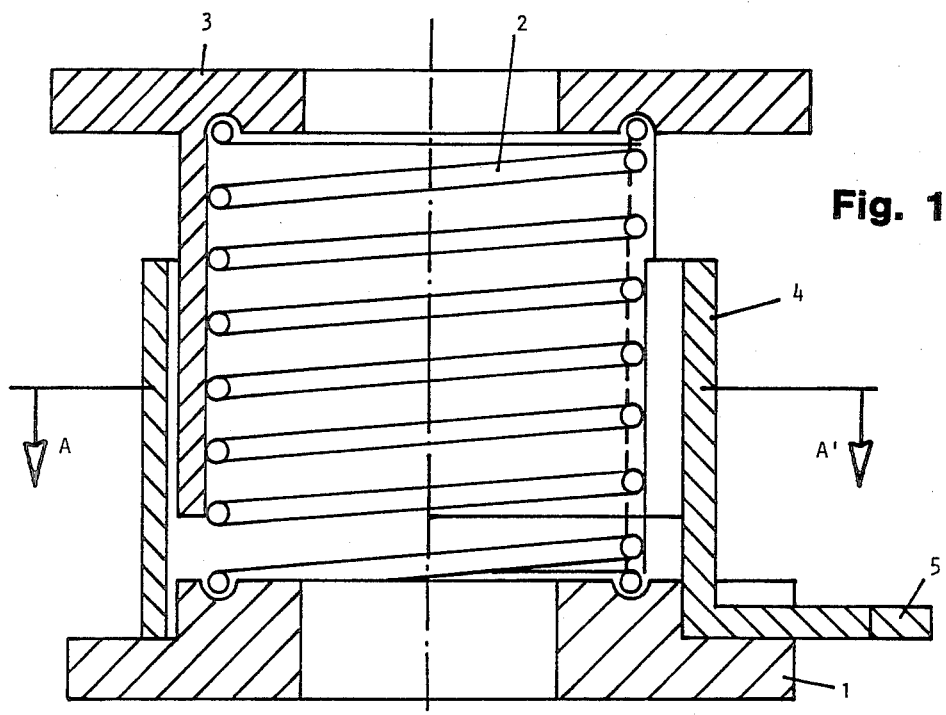

United States Patent [19]

Kaiser

[11] Patent Number: 4,722,505
[45] Date of Patent: Feb. 2, 1988

[54] RESILIENT MOUNT WITH VARIABLE ANTIVIBRATION CONTROLS FOR RECORD PLAYERS

[75] Inventor: Bernhard Kaiser, St. Georgen-Peterzell, Fed. Rep. of Germany

[73] Assignee: Deutsche Thomson-Brandt GmbH, Villingen-Schwenningen, Fed. Rep. of Germany

[21] Appl. No.: 23,804

[22] PCT Filed: Apr. 2, 1986

[86] PCT No.: PCT/EP86/00200

§ 371 Date: Jan. 13, 1987

§ 102(e) Date: Jan. 13, 1987

[87] PCT Pub. No.: WO86/06537

PCT Pub. Date: Nov. 6, 1986

[30] Foreign Application Priority Data

Apr. 19, 1985 [DE] Fed. Rep. of Germany ....... 3514164

[51] Int. Cl.$^4$ .......................................... F16M 13/00
[52] U.S. Cl. .................................... 248/561; 248/563; 248/566; 248/621; 248/623; 267/205; 297/71
[58] Field of Search ............... 248/621, 561, 562, 563, 248/566, 616, 623; 188/381, 129; 267/197, 198, 196, 205; 279/71, 72, 73

[56] References Cited

U.S. PATENT DOCUMENTS

| 374,732 | 12/1887 | Chappell | 279/73 |
| 1,866,274 | 7/1932 | Stoller . | |
| 2,211,416 | 8/1940 | Goldsmith | 248/562 X |
| 2,534,433 | 12/1950 | Fuchs | 188/129 X |
| 3,263,953 | 8/1966 | Shottenfeld et al. | 248/621 X |
| 4,633,973 | 1/1987 | Kitano | 248/621 X |

FOREIGN PATENT DOCUMENTS

| 0014058 | 8/1980 | European Pat. Off. . |
| 2547849 | 5/1976 | Fed. Rep. of Germany . |
| 792181 | 3/1958 | United Kingdom . |
| 1048369 | 11/1966 | United Kingdom . |
| 2063547 | 6/1981 | United Kingdom . |
| 2143299 | 2/1985 | United Kingdom . |

Primary Examiner—J. Franklin Foss
Assistant Examiner—David L. Talbott
Attorney, Agent, or Firm—Max Fogiel

[57] ABSTRACT

A mount for a record player with variable antivibration controls that make it possible for the user of the player to separately establish an optimum antivibration setting depending on the conditions of the specific surface that the player is resting on and on the overall acoustical conditions with respect to footstep and acoustical feedback.

11 Claims, 4 Drawing Figures

RESILIENT MOUNT WITH VARIABLE ANTIVIBRATION CONTROLS FOR RECORD PLAYERS

The chassis or housing of a record player must, as is known, be resiliently separated from the supporting surface that the player rests on to prevent transmission of any vibrations in the supporting surface to the record and/or tone-arm mount and accordingly impair the pick-up. Resilient materials like rubber, compression or tension springs, or silicone for example are employed to obtain the separation. The resiliency properties are selected to ensure that the inherent resonance of the mass that is to be separated coincides with the effective resiliency of the mount, preferably in the low-frequency range, at 2 to 10 Hz for instance.

Providing the resilient elements, which naturally have an inherent, even though low, antivibration property, with an increased antivibratin capacity to prevent oscillations that are too great or last too long when the oscillation profile is subjected to a sudden stimulation is also known. Depending on the level of antivibration employed, the absorption capacity will vary from what is called a footstep sound, low-frequency excitation in the range below 20 Hz reflected in playback malfunctions in the form of non-linear distortions or of the needle skipping out of the groove.

The level of antivibration also affects the function of the player in relation to acoustical feedback, which can appear in the middle audio-frequency range when the speaker or speakers are positioned close enough to the record player to allow feedback.

When the antivibration levels of the mount for the player or chassis are different, the footstep and feedback sensitivities will be mutually opposed. An overall solution for both problems is hardly possible because the external conditions differ in the strength of their effects.

The object of the present invention is to create a mount for a record player with variable antivibration controls that will make it possible for the user of the player to separately establish an optimum antivibration setting depending on the conditions of the specific surface that the player is resting on and on the overall acoustical conditions with respect to footstep and acoustical feedback.

This object is attained in accordance with the invention in a device of the type recited in the preamble to claim 1 by the improvement recited in the body thereof. Other details and embodiments can be derived from the subsidiary claims and from the specification.

The resilient antivibration controls in accordance with the invention allow the user to control the effects of both footstep and feedback by appropriate adjustment of the activating arm. When, for example, it is impossible for acoustical feedback to occur, the highest possible level of antivibration should be established. When, on the other hand, there is a definite tendency toward feedback, the antivibration controls should be completely or extensively disengaged.

Figure 2:
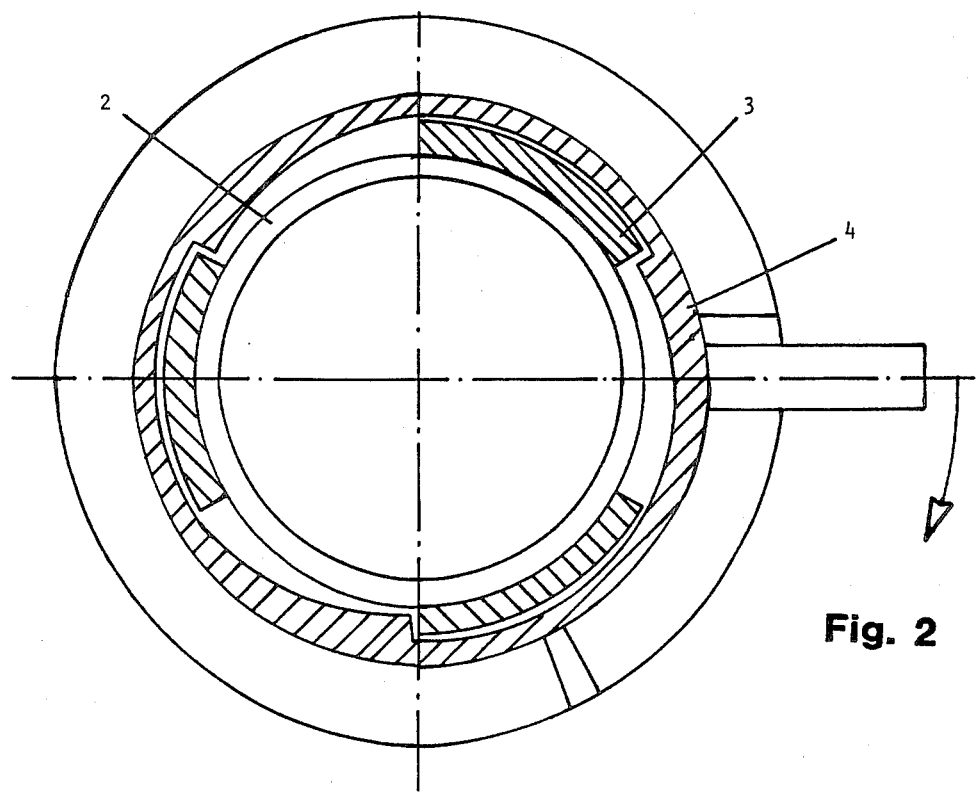
Figure 3A:
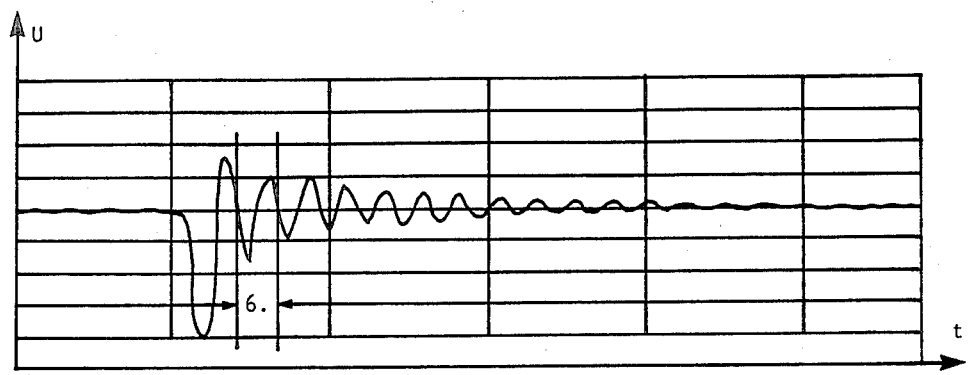
Figure 3B:
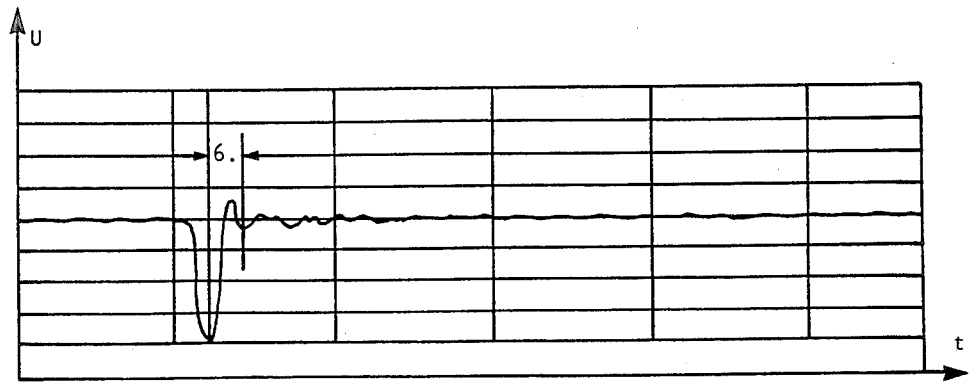

An embodiment of the invention will now be described with reference to the drawings, wherein FIG. 1 is a side view of a resilient mount sectioned along the plane of the central axis, FIG. 2 is a section along the plane A—A' in FIG. 1 as viewed from above, and FIGS. 3a and 3b are graphs of the voltage U induced in the pick-up as a function of time, without antivibration in 3a and with a high level of antivibration in FIG. 3b.

As will be evident from FIG. 1, a helical compression spring 2, a rubber antivibration component 3, and a setting component 4 are positioned mutually concentric, with the setting component 4 and the compression spring 2 resting on a flange 1. Rubber antivibration component 3 also has a flange with a central hole and a concentric groove, wherein the top of compression spring 2 rests. Since the segments of the wall of cylindrical setting component 4 vary gradually in thickness in one of the directions that seting component 4 rotates in, the corresponding sections of rubber antivibration component 3 can be adjusted between a low and a very high level of antivibration by rotating setting component 4 by means of pivoting a radially projecting arm 5 that is integrated onto it by no more than 60°. In FIG. 2 the three segments of rubber antivibration component 3 are positioned in the no-antivibration position between compression spring 2 on the inside and the curved segments of setting component 4. FIGS. 3a and 3b are graphs of voltage U as a function of time t when for example there is an impact against the player that generates a corresponding voltage in the pick-up system. FIG. 3a illustrates the curve without antivibration and FIG. 3b with a high level of antivibration.

I claim:

1. A resilient chassis mount and/or housing mount with variable antivibration controls for a record player, wherein resilient materials, like rubber and like helical springs in particular, produce separation in conjunction, comprising the following means positioned mutually coaxial: helical spring means: rubber antivibration means comprising a flange, and segments in shape of a cylindrical surface and in one piece therewith; setting means in shape of a cylindrical surface and having segments with walls varying in thickness along one direction of rotation, said setting means having a radially projecting arm for initiating rotation; and flange means with a concentric means for accommodating said setting means.

2. A resilient chassis mount and/or housing mount as defined in claim 1, wherein said helical spring means is at least partly cylindrical.

3. A resilient chassis mount and/or housing mount as defined in claim 1, wherein said segments of said rubber antivibration means are positioned between said helical spring means and said cylindrical surface of said setting means.

4. A resilient chassis mount and/or housing mount as defined in claim 2, wherein said helical spring means is on the inside and said setting means is on the outside.

5. A resilient chassis mount and/or housing mount as defined in claim 2, wherein said helical spring means is on the outside and said setting means is on the inside.

6. A resilient chassis mount and/or housing mount as defined in claim 1, wherein said helical spring means comprises a compression spring.

7. A resilient chassis mount and/or housing mount as defined in claim 1, wherein each section of said setting means has a wall varying in thickness over 120°.

8. A resilient chassis mount and/or housing mount as defined in claim 1, wherein each section of said rubber anti-vibration means assumes an angle of 60°.

9. A resilient chassis mount and/or housing mount as defined in claim 1, wherein said concentric means comprises a shoulder.

10. A resilient chassis mount and/or housing mount as defined in claim 1, wherein said concentric means comprises a setback.

11. A resilient chassis mount and/or housing mount as defined in claim 1, whrein said concentric means comprises a groove.

* * * * *